(12) United States Patent
Chmelka et al.

(10) Patent No.: US 7,837,909 B2
(45) Date of Patent: Nov. 23, 2010

(54) MESOSTRUCTURED INORGANIC MATERIALS PREPARED WITH CONTROLLABLE ORIENTATIONAL ORDERING

(75) Inventors: Bradley F. Chmelka, Goleta, CA (US); Jordi Nolla, Catalunya (ES); Christian A. Steinbeck, Waltham, MA (US); George L. Athens, Goleta, CA (US); Douglas Wildemuth, Goleta, CA (US)

(73) Assignee: The Regents of the University of California, Oakland, CA (US)

( * ) Notice: Subject to any disclaimer, the term of this patent is extended or adjusted under 35 U.S.C. 154(b) by 885 days.

(21) Appl. No.: 11/735,252

(22) Filed: Apr. 13, 2007

(65) Prior Publication Data

US 2007/0248760 A1      Oct. 25, 2007

Related U.S. Application Data

(60) Provisional application No. 60/792,050, filed on Apr. 13, 2006.

(51) Int. Cl.
 *C04B 35/634* (2006.01)
(52) U.S. Cl. ............. 264/42; 264/44; 264/45.5
(58) Field of Classification Search .......... 264/42, 264/44, 45.5
See application file for complete search history.

(56) References Cited

U.S. PATENT DOCUMENTS

| | | | |
|---|---|---|---|
| 6,541,539 B1 * | 4/2003 | Yang et al. | 523/200 |
| 6,592,764 B1 | 7/2003 | Stucky et al. | |
| 6,952,436 B2 * | 10/2005 | Wirnsberger et al. | 372/39 |
| 2002/0190415 A1 | 12/2002 | Yang et al. | |
| 2005/0214539 A1 * | 9/2005 | Ying et al. | 428/408 |

OTHER PUBLICATIONS

Alberius et al. General predictive syntheses of cubic, hexagonal, and lamellar silica and titania mesostructured thin films. Chem. Mater., vol. 14, pp. 3284-3294 (2002).

Grudzien et al. Effect of organosilane/polymer ratio on adsorption properties of periodic mesoporous ethane-silica. Colloids and Surfaces A: Physicochem. Eng. Aspects, vol. 300, pp. 235-244 (2007).

Melosh et al. Mesostructured silica/block copolymer composites as hosts for optically limiting tetraphenylporphyrin dye molecules. J. Phys. Chem. B, vol. 108, pp. 11909-11914 (2004).

(Continued)

*Primary Examiner*—Kat Wyrozebski
*Assistant Examiner*—James Sanders
(74) *Attorney, Agent, or Firm*—John P. O'Banion (57) ABSTRACT

Mesostructured inorganic-organic materials, in the form of patterned films, monoliths, and fibers, can be prepared with controllable orientational ordering over macroscopic length scales. They are synthesized by controlling solvent removal rates across material interfaces, in conjunction with the rates of surfactant self-assembly and inorganic cross-linking and surface interactions. A method for controlling the rates and directions of solvent removal from a heterogeneous material synthesis mixture that allows the nucleation and directional alignment of self-assembling mesostructures to be controlled during synthesis is disclosed. The aligned mesostructured inorganic-organic materials and mesoporous inorganic or carbon materials can be prepared in the form of patterned films, monoliths, and fibers with controllable orientational ordering. Such materials possess anisotropic structural, mechanical, optical, reaction, or transport properties that can be exploited for numerous applications in opto-electronics, separations, fuel cells, catalysis, MEMS/microfluidics, for example.

35 Claims, 9 Drawing Sheets

OTHER PUBLICATIONS

Tian et al. Syntheses of high-quality mesoporous materials directed by blends of nonionic amphiphiles under nonaqueous conditions. J. Solid State Chem., vol. 167, pp. 324-329 (2002).

Yang et al. Generalized syntheses of laarge-pore mesoporous metal oxides with semicrystalline frameworks. Nature, vol. 396, pp. 152-155, Nov. 12, 1998.

Zhao et al. Continuous mesoporous silica films with highly ordered large pore structures. Adv. Mater., vol. 10, No. 16, pp. 1380-1385 (1998).

Zhao et al. Nonionic triblock and star diblock copolymer and oligomeric surfactant syntheses of highly ordered, hydrothermically stable, mesoporous silica structures. J. Am. Chem. Soc., vol. 6024-6036 (1998).

* cited by examiner

MESOSTRUCTURED INORGANIC MATERIALS PREPARED WITH CONTROLLABLE ORIENTATIONAL ORDERING

CROSS-REFERENCE TO RELATED APPLICATIONS

This application claims priority from U.S. provisional application No. 60/792,050, filed on Apr. 13, 2006, incorporated herein by reference in its entirety.

STATEMENT REGARDING FEDERALLY SPONSORED RESEARCH OR DEVELOPMENT

This invention was made with Government support under Grant No. DMR-0233728, awarded by the National Science Foundation. The Government has certain rights in this invention.

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to preparing inorganic mesostructured materials, and more particularly to preparing patterned inorganic mesostructured materials, with controllable orientational ordering for anisotropic structural, mechanical, optical, reaction or transport properties for applications in opto-electronics, separations, fuel cells, catalysis, or MEMS/microfluidics.

2. Description of Related Art

A great deal of recent research towards obtaining orientational ordering in mesostructured inorganic materials has focused on producing materials with non-linear optical properties. Therefore, this brief review of the state-of-the-art will focus on the type and performance of different optical materials. Much research has centered on the alignment of optically-responsive guest species within a host matrix. While a wide range of guest species have been used, host matrices have focused on polymer or inorganic materials. Work on polymer systems has included dissolving optically-responsive molecules within the polymer, incorporating the optically-responsive species as covalently bonded side chains on the polymer backbone, or designing the polymer molecules with the guest species incorporated directly into the backbone chain of the polymer. In addition to polymer host matrices, inorganic glasses composed of oxides of silicon, aluminum, or titanium have been synthesized through sol-gel processing with optically-responsive guest species incorporated. Finally, in an attempt to combine the beneficial properties of both polymer and inorganic host materials, sol-gel derived hybrid organic-inorganic materials have been investigated for optical applications.

Inorganic single crystals, such as lithium niobate or potassium dihydrogen phosphate, are currently the most widely used materials in electro-optic devices. Major drawbacks of these single crystals include the high pressures and temperatures required during materials processing, large materials cost, and poor environmental stability. To overcome the obstacles presented by inorganic single crystals, guest-host systems using polymer or inorganic glass host matrices containing homogeneously dispersed, non-linear optically-responsive species have been developed. In both types of host materials, the guest species are aligned through the application of an electric field. Electric field poled systems of polymers such PMMA doped with the chromophore 4-(dicyanovinyl)-4-(dialkylamino)azobenzene have shown chromophore densities up to $2.3 \times 10^{20}$ cm$^{-3}$ and poling alignment of $d_{33}$=74 pm/V. However, the poling alignment of the sample had decayed to $d_{33}$=19 pm/V after several days at room temperature. This example illustrates both the possibility for high guest molecule solubility and the poor thermal stability of polymer host materials. In contrast to polymer systems, sol-gel-processed wholly inorganic or organically-modified inorganic glasses exhibit greater thermal stability, but lower guest molecule solubility. For example, poling alignment of $d_{33}$=60-100 pm/V and temporal stability of up to 10,000 hours have been reported for silica-organic systems containing functionalized azo dyes, such as Dispersed Red. Unfortunately, these organically-modified inorganic glasses only allow guest molecule doping concentrations of up to ~5 wt %.

Transparent mesostructured inorganic-organic hybrid materials with aligned mesopores provide a means to combine the beneficial properties of both polymer and inorganic glass host materials. Self-assembled surfactant-templated mesostructured materials allow for tunable guest-host interactions due to the numerous periodic structures (e.g., lamellar, 2D or 3D hexagonal, cubic, worm-like), pore dimensions (3-50 nm), structure-directing agent (SDA), guest species, and framework compositions possible. In addition, the sol-gel processing involved in the 'bottom-up' synthesis of these materials allows for convenient, inexpensive device fabrication. However, conventional mesostructured inorganic films generated by solvent evaporation using spin-coating or dip-coating generally have micron-size domains that are randomly oriented over macroscopic length scales. If mesostructured inorganic-organic materials are to be used in non-linear optical or other anisotropic membrane applications, materials with aligned mesochannels need to be attained over macroscopic length scales.

Several techniques have obtained limited success in gaining precise control over mesopore alignment. Magnetic field alignment has been used to synthesize hexagonal mesostructured silica, but radial integration over the width of the (100) reflection in the 2D X-ray diffraction pattern indicates only partial alignment with a distribution of domain orientations of 53° FWHM. An alternative method to obtaining mesochannel alignment involves treating the substrate with a rubbed polymer prior to deposition of the mesostructured inorganic-organic film. Mesoporous silica deposited on PTFE-rubbed glass substrates showed a distribution of domain orientations of ~15° FWHM. More recently, polyimide-rubbed substrates have produced degrees of alignment up to ~30° FWHM.

While the degree of alignment has been significantly improved over the last decade, these techniques only produce mesochannel alignment parallel to the substrate. Researchers at IBM have formed continuous non-patterned silica films with mesochannel alignment perpendicular to the silicon substrate by treating the sample in a chamber of chloroform and octane vapors, which is difficult to control.

Incorporation of small molecule chromophores and semiconducting polymers into aligned hexagonal mesoporous silica films has demonstrated non-linear optical properties. Highly polarized luminescence was acquired from poly[2-methoxy-5-(2'-ethyl-hexyloxy)-1,4-phenylene vinylene] imbibed into mesoporous silica films produced using the polyimide-rubbing technique. In addition, low-molecular weight cyanine dyes doped into polyimide-rubbed mesostructured silica films have exhibited polarized visible light absorption. These reports illustrate the anisotropy of guest species inside aligned mesochannels of mesostructured inorganic-organic hybrid films.

Mesostructured inorganic-organic hybrid materials have been formed into films, fibers, monoliths, and micro-patterns made by soft lithography. For optical device applications, thin films or monoliths are the preferred morphologies. Typically, during the synthesis of thin films, a sol-gel solution containing a structure-directing agent, soluble metal oxide precursors, water, and diluted in a volatile co-solvent such as ethanol, is either dip-coated or spin-coated onto a substrate. Subsequent patterning of these films has traditionally been performed by conventional photolithography or self-assembling ink-jet printing. The mesostructures of thin films made in this fashion are characterized by domains consisting of nanoscopic structures that are well ordered over areas of ~1 µm, but these micron size domains are randomly oriented over macroscopic length scales.

BRIEF SUMMARY OF THE INVENTION

The present invention pertains to preparing inorganic mesostructured materials with controllable orientational ordering for anisotropic structural, mechanical, optical, reaction, or transport properties for applications in opto-electronics, catalysis, separations, fuel cells, and microfluidics. By way of example, and not of limitation, novel mesostructured inorganic-organic materials have been prepared as patterned films with high degrees of orientational ordering, the direction or axes of which can be controlled by the processing conditions.

According to an aspect of the invention, the preparation procedure involves controlling the removal of volatile solvents in the presence of self-assembling organic components and network-forming inorganic species. The use of stamping or molding techniques within a controlled environment (e.g., humidity, temperature, solvent concentration) allows the rate of solvent loss (e.g., by evaporation or diffusion) to be adjusted to influence the direction of mesophase alignment. Furthermore, micromolding allows for simultaneous patterning of the mesostructured film on micrometer length scales, with mesophase alignment further influenced by the relative orientations of the micromold and substrate structural features. Potential applications for these novel materials include their use as optical materials, membranes, and in microfluidic devices. For example, confinement of optically-responsive guest species in the aligned hydrophobic or hydrophilic regions of these patterned thin films yields materials with anisotropic (e.g., non-linear, polarized) optical or transport (e.g., diffusion) properties. The ease of processing and versatility for incorporating desirable compositions and structures further allow these materials to be prepared with properties that enable their use in a wide range of device applications.

According to another aspect of the invention, the processing method provides the novel attribute of simultaneous alignment of the mesostructure on the nanometer length scale and patterning of the thin film on the micrometer length scale or larger, depending on the stamp or mold dimensions. Moreover, whereas current state-of-the-art optical materials require poling of the guest species to obtain anisotropic or non-linear optical properties, inorganic-organic hybrid materials yield non-linear or anisotropic (e.g., polarized) absorption/emission optical properties by confining guest species in the patterned, orientationally ordered mesophase. The new method for obtaining orientational ordered guest species allows for diverse compositions, structures, and dimensions, allows the direction of alignment to be controlled, and provides for anisotropic material properties, including mechanical, optical, transport, reaction, and/or thermal, which represent significant improvements when compared to current state-of-the-art materials.

Another aspect of the invention is a method of forming an orientationally ordered mesostructured inorganic-organic material produced by molding self-assembling organic agents and network-forming inorganic species in a controlled environment, comprising: combining solvent concentration control and surface interaction control to provide for mesostructural alignment.

One mode of this aspect comprises using the molding to achieve thin film patterning and mesostructural orientational ordering on the length scale of the patterning. In one embodiment, the patterning is on a length scale greater than 50 nm.

Another mode of this aspect comprises using the molding to produce a monolith having approximately uniform mesostructural orientational ordering on the length scale of the monolith.

Another mode of this aspect comprises using the molding to produce a fiber having approximately uniform mesostructural orientational ordering on the length scale of the fiber.

Still another mode of this aspect further comprises dispersing orientationally ordered guest species in the mesostructured inorganic-organic material by dispersing the guest species in a self-assembling solution of inorganic precursors, structure-directing agents, and one or more volatile solvents.

In one embodiment of this mode, the orientationally ordered guest species comprise small molecule chromophores, conjugated polymers, metal clusters, ions, oxide guests, nanoparticles, nanowires, nanocrystals, carbon nanotubes, fullerenes, semiconducting polymers, organic molecules, inorganic molecules, organometallic molecules, molecules with sensing, catalytic, or other reaction functionalities, enzymes, or other biomolecules, cells, or viruses with biological functionalities, including mixtures thereof.

In another embodiment of this mode, the orientationally ordered guest species are optically-responsive. In further embodiments, the optically-responsive species include, but are not limited to, small molecule chromophores, conjugated polymers, nanoparticles, nanowires, nanocrystals, carbon nanotubes, fullerenes and its derivatives; or the optically-responsive guest species are associated with the organic regions of said mesostructured inorganic-organic material; or the optically-responsive guest species are associated with the inorganic regions of said mesostructured inorganic-organic material.

In other embodiments of this mode, the orientationally ordered guest species are electronically-responsive or the orientationally ordered guest species are electrically-responsive.

Another mode of this aspect comprises controlling orientational order of the mesostructured material by controlled removal of one or more volatile solvents. In various embodiments of this mode, the orientational order has the form of a hexagonal mesostructure with cylinder-like features oriented parallel to the substrate surface; the form of a lamellar mesostructure with layered-like features oriented parallel to the substrate surface; the form of a cubic mesostructure with channels oriented with respect to the substrate surface; the form of a hexagonal mesostructure with cylinder-like features oriented perpendicular to the substrate surface; or the form of a lamellar mesostructure with layered-like features oriented perpendicular to the substrate surface.

Another mode of this aspect comprises controlling orientational order of the mesostructured material by controlled removal of one or more volatile solvents via gradients within a mold device.

Another mode of this aspect comprises controlling orientational order of the mesostructured material by controlled removal of one or more volatile solvents on a substrate with aligned features.

In another mode of this aspect, the molding comprises using a patterned stamp/mold composed of a low compression modulus material, such as poly(dimethylsiloxane) (PDMS), and/or a high compression modulus material such as a cross-linked or glassy polymer, photoresist, silicon, or sol-gel derived oxides.

In another mode of this aspect, the mesostructured inorganic-organic material is formed using a low compression modulus material to direct the dynamics of solvent removal on a patterned surface.

In another mode of this aspect, the network-forming inorganic species form a disordered, partially crystalline, nanocrystalline, or crystalline network.

In still another mode of this aspect, one or more of said network-forming inorganic species also contains an organic moiety.

In another mode of this aspect, the network-forming inorganic species include, but are not limited to, a metal oxide, silica, alumina, titania, semiconducting solids, metals, including mixtures thereof.

Yet another mode of this aspect comprises removing organic structure-directing species by oxidation or solvent extraction treatments, yielding a mesoporous inorganic material. One embodiment of this mode comprises performing surface modification of said mesoporous inorganic material.

Another embodiment of this mode comprises incorporating one or more optically-responsive guest species into the mesoporous inorganic material. Further embodiments successively comprise bonding the optically-responsive guest species to the inorganic framework of the mesoporous film; and incorporating one or more organic species into the mesoporous inorganic material.

In still further embodiments, the organic species incorporated into the mesoporous inorganic material are treated to yield an orientationally ordered mesostructured carbon material; the orientationally ordered mesostructured carbon material is a mesoporous carbon material; the orientationally ordered mesoporous carbon material is a film; and the orientationally ordered mesoporous carbon material has a cubic mesostructure.

Another aspect of the invention is a method for preparing mesostructured inorganic-organic materials with controllable orientational ordering for optical, opto-electronic, catalytic, fuel cell, membrane, or microfluidic device applications, comprising: controlling removal of volatile solvents in the presence of self-assembling organic components and network-forming inorganic species.

One mode of this aspect comprises using a mold or barrier to control the rate of solvent removal to influence the direction of mesophase alignment. In one embodiment of this mode, the mold or barrier allows for patterning of a mesostructured film on micrometer length scales. This embodiment can further comprise controlling solvent concentration in the mold or barrier to influence the direction of mesophase alignment, creating an orientationally ordered mesostructured film patterned on the micrometer length scale, using a micromold on an aligned substrate to influence the direction of mesophase alignment, or using a micromold on an aligned inorganic substrate to influence the direction of mesophase alignment.

Still another aspect of the invention is an orientationally ordered mesostructured inorganic-organic or mesoporous inorganic or carbon material fabricated according to any of the methods recited hereinabove.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only.

DETAILED DESCRIPTION OF THE INVENTION

Referring more specifically to the drawings, for illustrative purposes the present invention is embodied in the systems generally shown in FIG. 1 through FIG. 21. It will be appreciated that the apparatus may vary as to configuration and as to details of the parts, and that the method may vary as to the specific steps and sequence, without departing from the basic concepts as disclosed herein.

Figure 1:
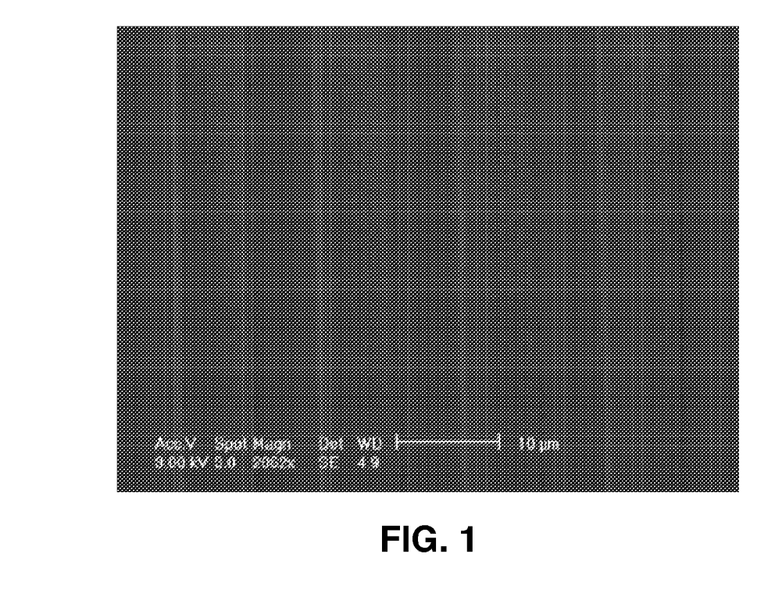
FIG. 1 is a scanning electron micrograph (SEM) top-down view of a patterned silica-$EO_{20}PO_{70}EO_{20}$ (P123, where EO and PO represent ethyleneoxide and propyleneoxide moieties, respectively) thin film prepared at relative humidity 97%.
Figure 2:
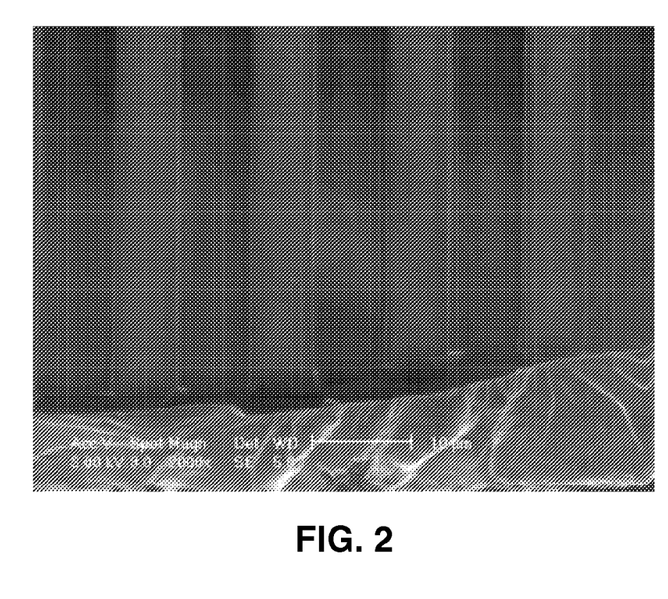
FIG. 2 is a scanning electron micrograph (SEM) cross-sectional view at a 45° tilt of a patterned silica-$EO_{20}PO_{70}EO_{20}$ (P123) thin film prepared at relative humidity 97%.
Figure 3:
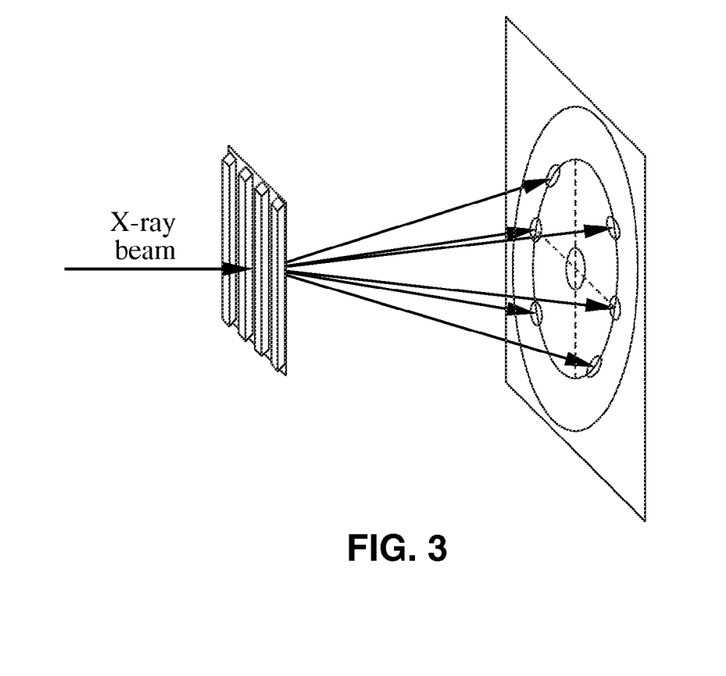
FIG. 3 shows a schematic diagram for transmission Small-Angle X-ray Scattering (SAXS) normal to the substrate plane, acquired for a patterned mesostructured silica film prepared at relative humidity 97%.
Figure 4:
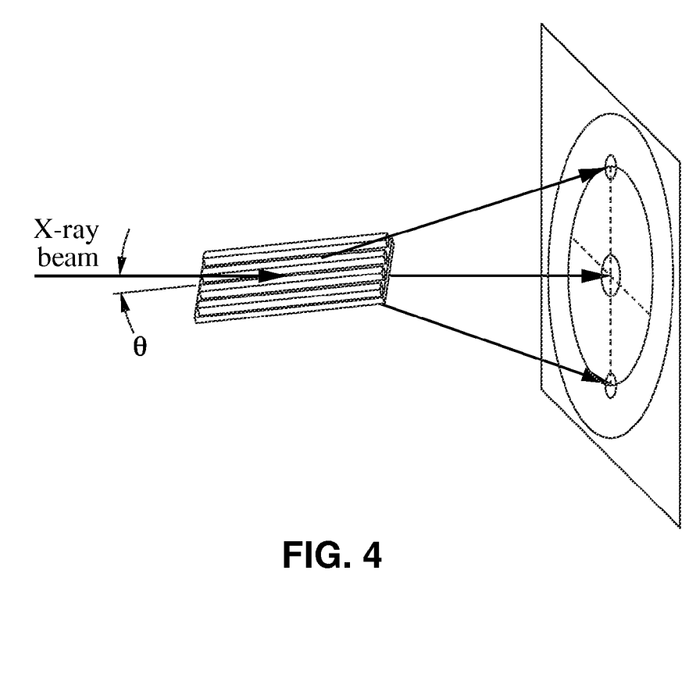
FIG. 4 shows a schematic diagram for Grazing Incidence Small-Angle X-ray Scattering (GISAXS) 3° tilted from parallel, acquired for a patterned mesostructured silica film prepared at relative humidity 97%.
Figure 5:
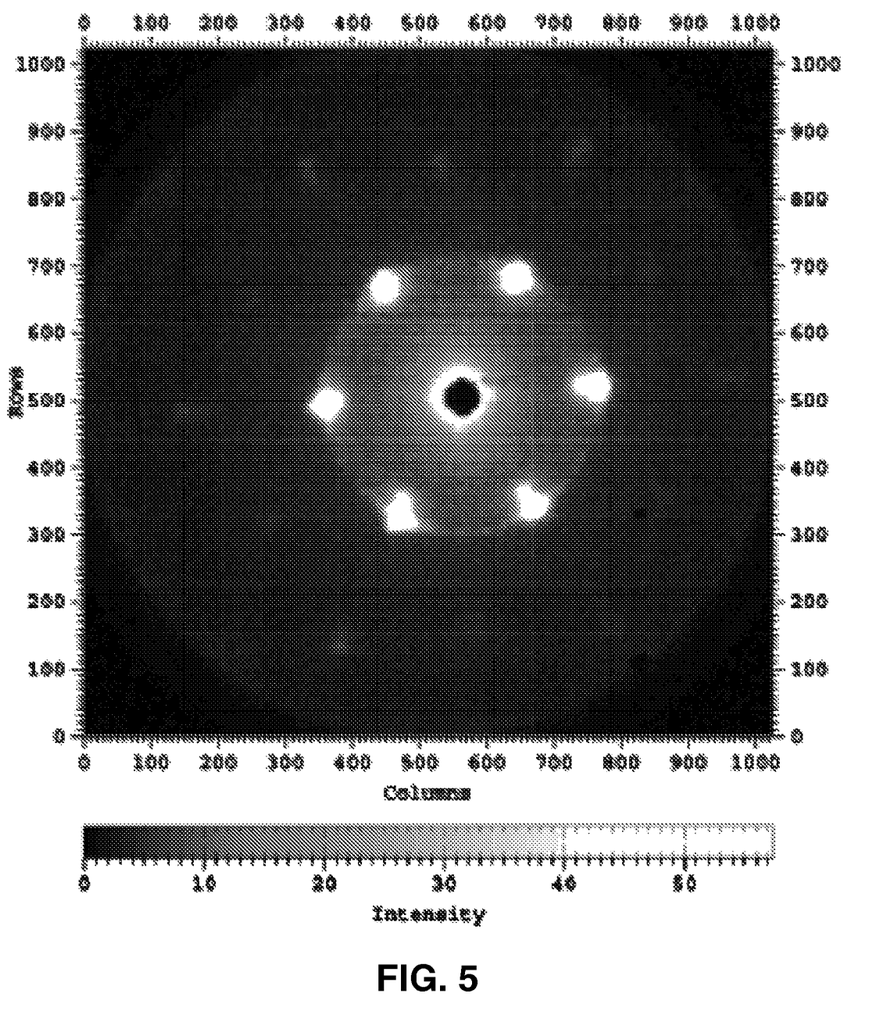
FIG. 5 shows diffraction patterns corresponding to the system shown in FIG. 3.
Figure 6:
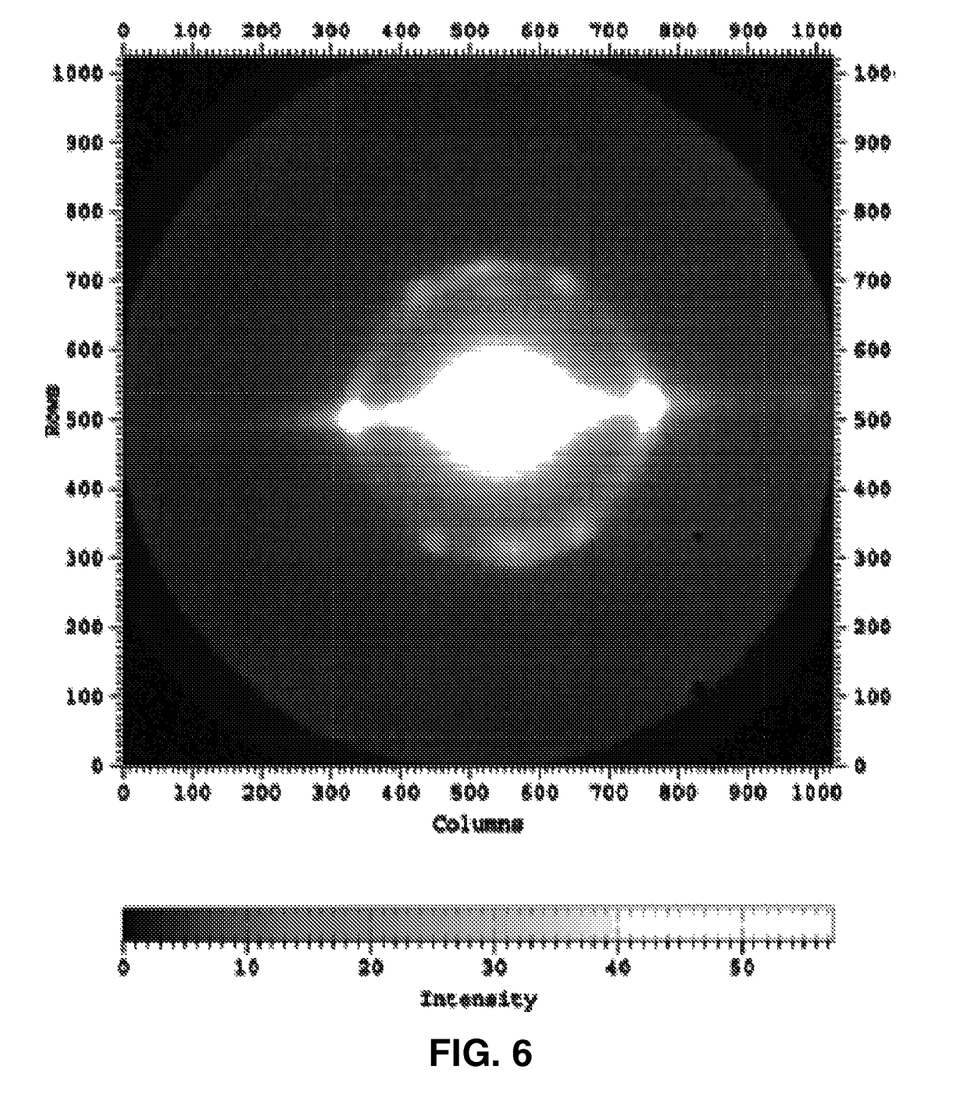
FIG. 6 shows diffraction patterns corresponding to the system shown in FIG. 4.
Figure 7:
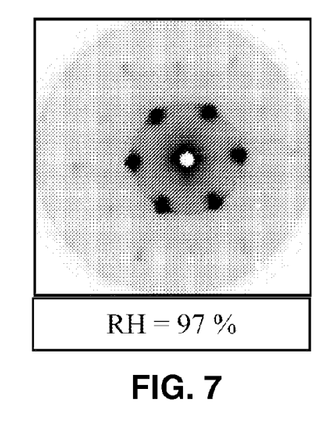
FIGS. 7-14 show 2D Small-Angle X-ray scattering (SAXS) diffraction patterns obtained for mesostructured silica-$EO_{20}PO_{70}EO_{20}$ thin films patterned by PDMS stamp micromolding under identical composition and conditions, except for different relative humidity environments. Hexagonal mesostructured films form with cylinders of PO oriented perpendicular to the substrate at high relative humidities. At relative humidities below 50%, the PO cylinders are oriented parallel to the substrate.
Figure 8:
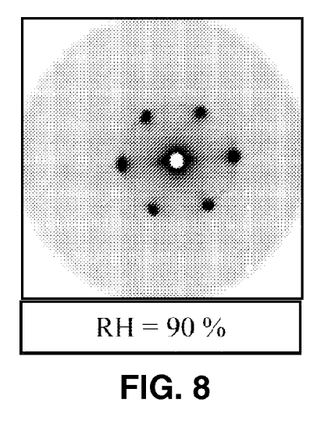
Figure 9:
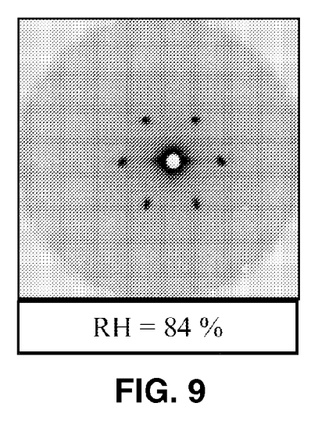
Figure 10:
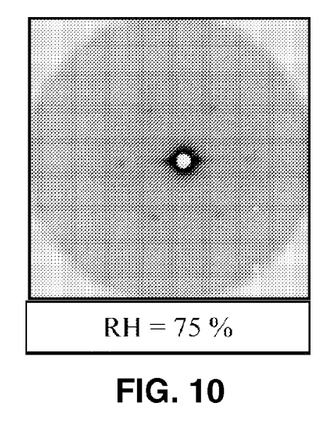
Figure 11:
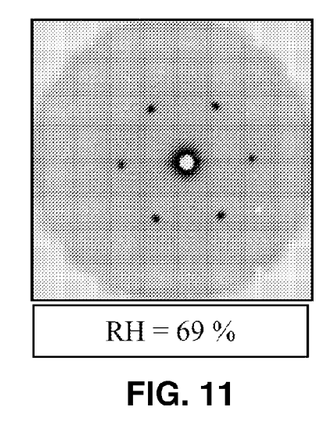
Figure 12:
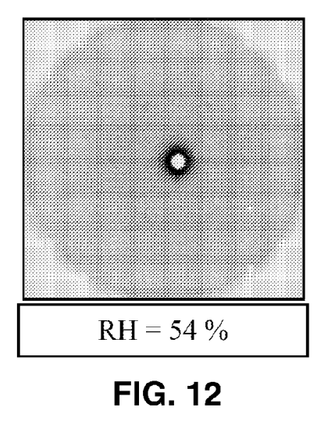
Figure 13:
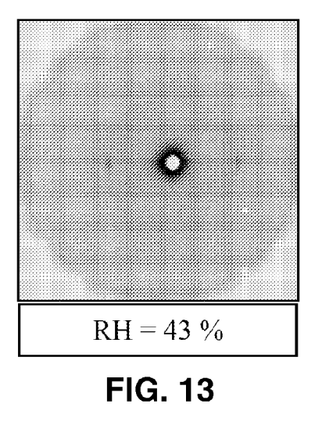
Figure 14:
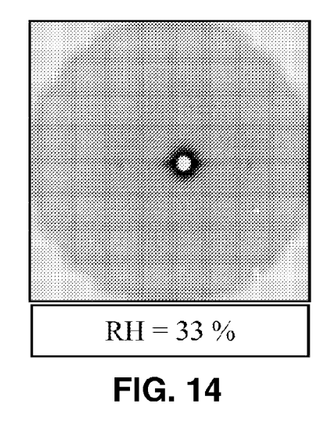
Figure 15:
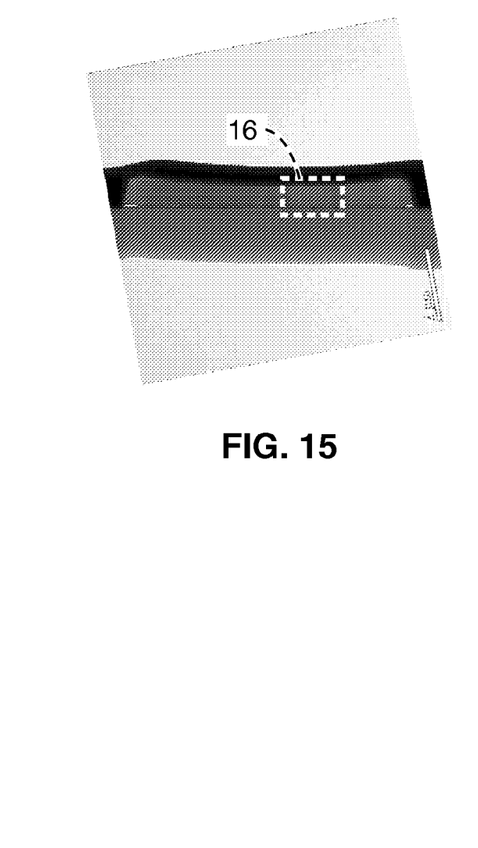
FIGS. 15-16 show a mesostructured silica-$EO_{20}PO_{70}EO_{20}$ thin film patterned by PDMS stamp micromolding and dried in a 97% relative humidity environment and a cross-sectional transmission electron micrograph (TEM) depicting hexagonally packed cylinders oriented perpendicular to the substrate in the indicated section of the thin film.
Figure 16:
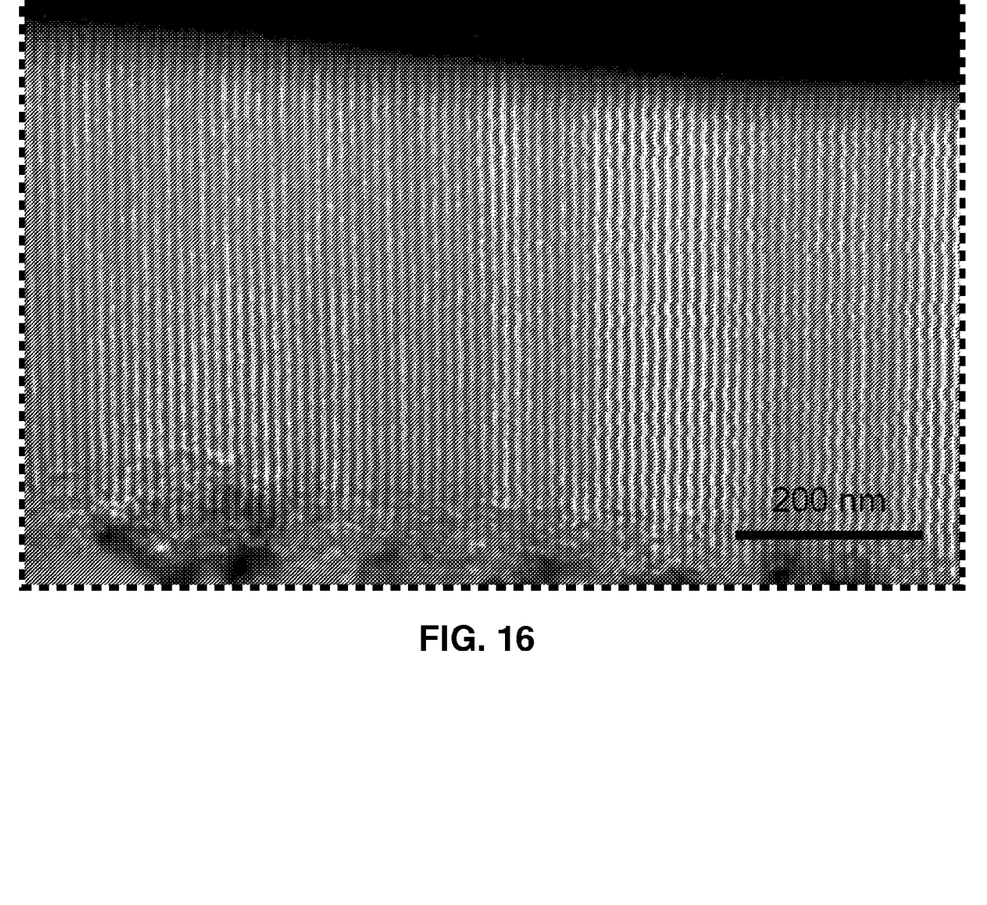
Figure 17:
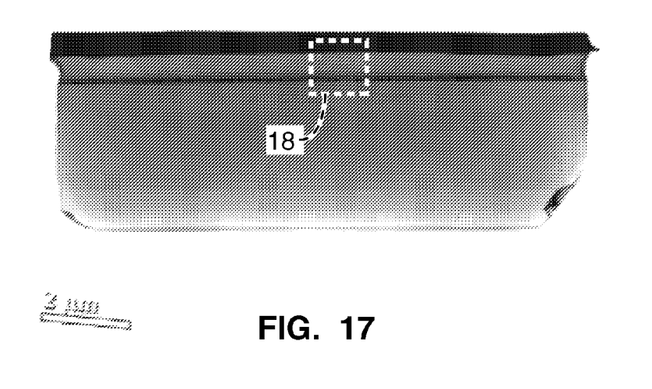
FIGS. 17-19 show a mesostructured silica-$EO_{20}PO_{70}EO_{20}$ thin film patterned by PDMS stamp micromolding and dried in a 97% relative humidity environment and successive cross-sectional transmission electron micrographs (TEM) depicting hexagonally packed cylinders oriented parallel to the substrate in the indicated section of the thin film.
Figure 18:
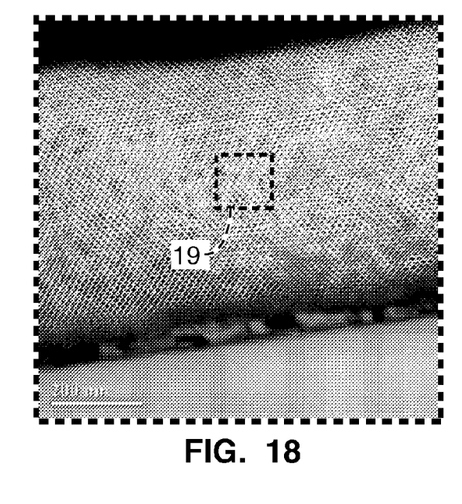
Figure 19:
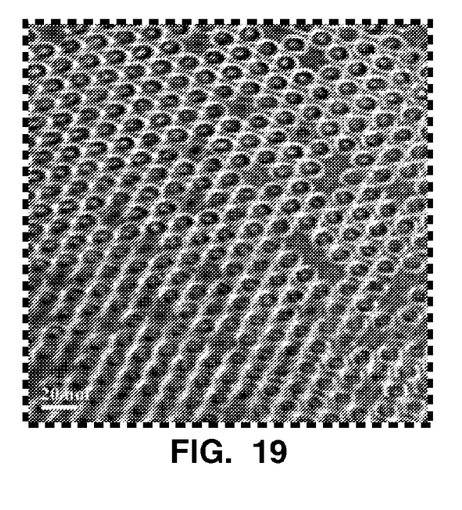

By controlling the solvent loss rates, in conjunction with rates of surfactant self-assembly and silica cross-linking, during the synthesis of the mesostructured thin films, nucleation and directional alignment of the mesoscale channels can be controlled. Control over the solvent loss rate is achieved through the combined use of stamping or molding and controlling solvent concentrations in the vicinity of the drying material. For the example of patterned inorganic-organic films, stamping or micromolding can be used to carry out the gelation and cross-linking of a self-assembling sol-gel solution within the confines of a stamp or mold (e.g., fabricated from poly(dimethylsiloxane), PDMS), and the substrate. During the slow collective processes of solvent loss, as occurs for example by evaporation or diffusion into the stamp itself, self-assembly of the structure-directing agent (SDA, e.g., low-molecular weight or block copolymer surfactant species), and polymerization of the hydrolyzed metal alkoxide precursor, a mesostructured inorganic-organic patterned film is formed according to the features of the PDMS stamp (FIGS. 1-2). These patterned films exhibit highly ordered mesostructures with high degrees of orientational order, as well. For example, the 2D small-angle X-ray diffraction pattern of a patterned thin film formed by the self-assembly of poly(ethylene oxide)-b-poly(propylene oxide)-b-poly(ethylene oxide) triblock copolymer P123 and silica polymerization indicates that the mesostructure, which extends over at least several square millimeters, consists of hexagonally-packed cylinders that are oriented perpendicular to the substrate. The transmission mode and grazing-incidence small-angle X-ray scattering (GI-SAXS) patterns shown in FIGS. 3-6 confirm long-range order of the hexagonally-packed cylinders in a mesostructured silica-block copolymer film.

The rate of solvent removal at interfaces between the sol-gel/structure-directing-agent (SDA) solution and the mold walls, external vapor environment, or other boundary, can be adjusted to control where the mesostructures nucleate and how they grow. By controlling the concentration and concentration gradients of solvent across the various boundaries, the local solvent concentration within the sol-gel/SDA can be managed, so that nucleation occurs at the interface(s) desired. As the solvent concentration in the sol-gel/SDA solution drops below the threshold for self-assembly of the structure-directing agent (e.g., surfactant or block copolymer species), mesostructural ordering develops, nucleating at interfaces where the solvent is most rapidly being removed. Furthermore, directionality of mesostructured domain growth can be controlled by adjusting the relative compatibilities of the different SDA, sol-gel, mold, or other boundary components, which establish surface compatibilities of the self-assembling components at the nucleation site/interface.

For example, for higher concentrations of solvent in the surrounding vapor atmosphere or within the mold, the rate of solvent removal from the sol-gel/SDA solution will be slower. When the rates of solvent removal, and thus also SDA self-assembly, are faster than the rate of silica cross-linking, the SDA self-assembles into an inorganic-organic hybrid material with mesostructural ordering that can be controlled by the ratio of silica precursor to SDA concentrations. A hexagonal mesostructure oriented perpendicular to the substrate results when solvent loss occurs normal to the substrate and into the hydrophobic PDMS stamp, with subsequent nucleation occurring at or near the PDMS-solution interface. Conversely, a hexagonal mesostructure oriented parallel to the substrate is formed when the solvent loss occurs parallel to the substrate dominated by diffusion of the solvent out the lateral sides of the PDMS or by evaporation at the solution-air interfaces at the microchannel ends. During these periods of solvent loss, the rate of silica condensation should be controlled, in part, by maintaining a fixed relative humidity to reduce silica cross-linking before self-assembly of the SDA can occur. Such control over the alignment of hexagonal or other mesostructures can therefore be achieved by a combination of stamp design, environmental conditions, and selection of inorganic-SDA solution composition. These design criteria allow control over the direction that solvent leaves the sol-gel/SDA solution, thus controlling where mesostructural ordered domains nucleate, the direction in which such domains grow, and the orientational order such domains develop.

A specific example is shown in FIGS. 7-14 whereby the water vapor concentration in the atmosphere surrounding a PDMS-micromolded sol-gel/SDA solution was controlled during material processing. Under these conditions, solvent loss by diffusion into the PDMS stamp, self-assembly of the P123 triblock copolymer SDA, and silica cross-linking occurred so as to yield a highly hexagonally mesostructurally ordered and vertically aligned mesostructured silica/P123 thin film composite. As the relative humidity of the atmosphere surrounding the PDMS-micromolded sol-gel/SDA solution decreases, the small-angle X-ray scattering (SAXS) patterns of the films indicate that the orientation of the patterned mesostructured silica-P123 composite changes from vertical to parallel relative to the substrate. The alignments of different mesostructured silica composites are corroborated by cross-sectional transmission electron microscopy (TEM) of the silica-P123 patterned films as shown in FIGS. 15-19. The ability to control mesostructural alignment parallel or perpendicular to the substrate by changing the processing conditions is a novel feature unattainable through previously reported techniques (e.g., polyimide rubbing, magnetic field, shear or shear alignment).

Therefore, the combination of stamping/molding, solvent concentration and transport in the stamp/mold, atmosphere, or other surrounding media, and stamp, substrate or interface surface treatments provides a versatile method that yields unprecedented control of orientational ordering in mesostructured inorganic-organic materials.

Due to their transparent mesoscopically ordered structures, inorganic-organic materials can serve as suitable hosts for incorporating various optically-responsive species. Encapsulating species, such as dyes, semiconducting polymers, or nanoparticles, within the highly aligned mesostructures of these thin films generates materials with novel combinations of properties. Polymers, oligomers, and aggregating small molecules can align when confined in hexagonally-packed cylinders that are uniaxially oriented. When the transition moments of optically-responsive species are orientationally ordered, anisotropic or non-linear optical properties can be induced. Incorporation of the guest species in the aligned mesostructured materials can be obtained through several methods. Aggregating small molecules, oligomers, nanoparticles, or polymers may be dissolved in the SDA-inorganic precursor solution, and as the solvent is removed (e.g., by evaporation or diffusion), the guest species can preferentially segregate into compatible regions of the aligned mesostructured domains. Alternatively, guest species can be incorporated after formation of the mesostructured composite and following removal of the structure-directing agent by post-synthetic introduction (e.g., by solvent imbibition, evaporation, ion exchange, or diffusion) of the guest species into the aligned mesopores. Introduction of guest species into the aligned mesopores can be aided by functionalizing the pore surfaces to enhance surface interactions and guest-host compatibility. For example, prior adsorption of organic molecules onto interior mesopore surfaces can be used to introduce desirable hydrophobicity that promotes the inclusion of other hydrophobic molecules (e.g., polymers). In addition, volatile small molecule guest species can be vapor deposited into empty mesopores. The alignment of the included optically responsive guest species can be established through techniques, such as polarization-dependent UV-visible optical absorption spectroscopy, luminescence, TEM, X-ray diffraction, and NMR.

EXAMPLE

Mesostructured silica films with 2D hexagonal structures (p6mm) are synthesized at room temperature with an acidic sol-gel solution containing amphiphilic poly(ethylene oxide)-b-poly(propylene oxide)-b-poly(ethylene oxide) triblock copolymer species as structure-directing agents for the polymerization of a metal oxide. A sol-gel solution containing the PEO-PPO-PEO triblock copolymer, soluble metal oxide precursor, water, acid, and ethanol solvent is prepared using methods known in the art. The reaction solution composition typically consists of 1.0 tetraethyoxysilane (TEOS): 0.017 $EO_{20}PO_{70}EO_{20}$: 6.35 $H_2O$: 0.05 HCl: 72 ethanol in molar ratio. The hydrochloric acid is added to adjust the pH of the solution to 1.5 because the hydrolysis of TEOS under acidic conditions (pH<2) leads to silica cations that strongly interact with the polyethylene oxide segments of the triblock copolymer micelles. The large amount of ethanol is used to prevent silica polymerization prior to mesostructural organization of the triblock copolymer and to provide a dilute enough solution for the micromolding technique. The optically-responsive species are also dissolved into the sol-gel precursor solution in concentrations of ~5 wt % prior to deposition of the solution onto the substrate and patterning.

Figure 20:
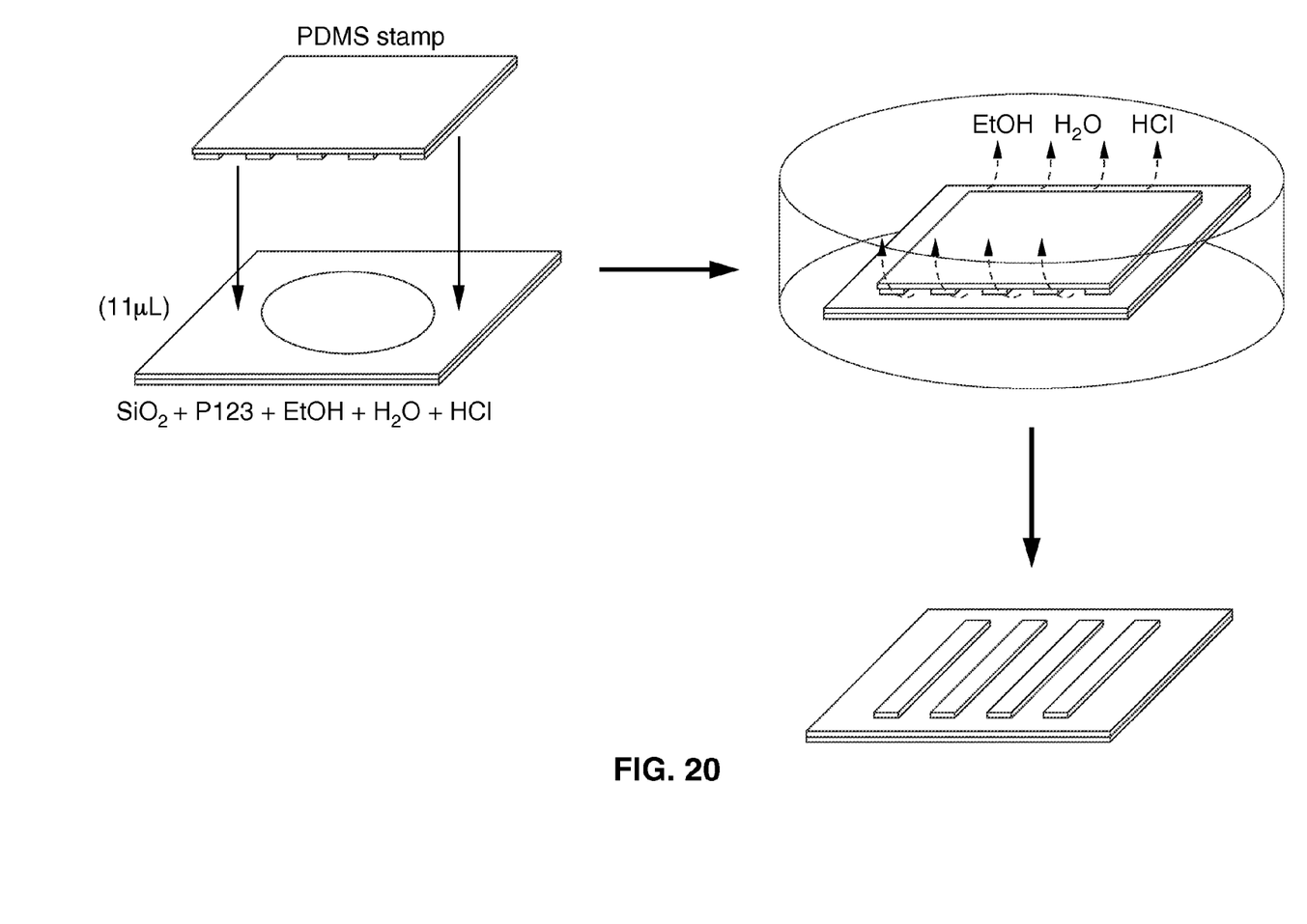
FIG. 20 is a schematic representation of the patterned silica-$EO_{20}PO_{70}EO_{20}$ thin film preparation using PDMS stamps to pattern the film and an environmental chamber to control the solvent vapor pressure above the sample while it cures.
Figure 21:
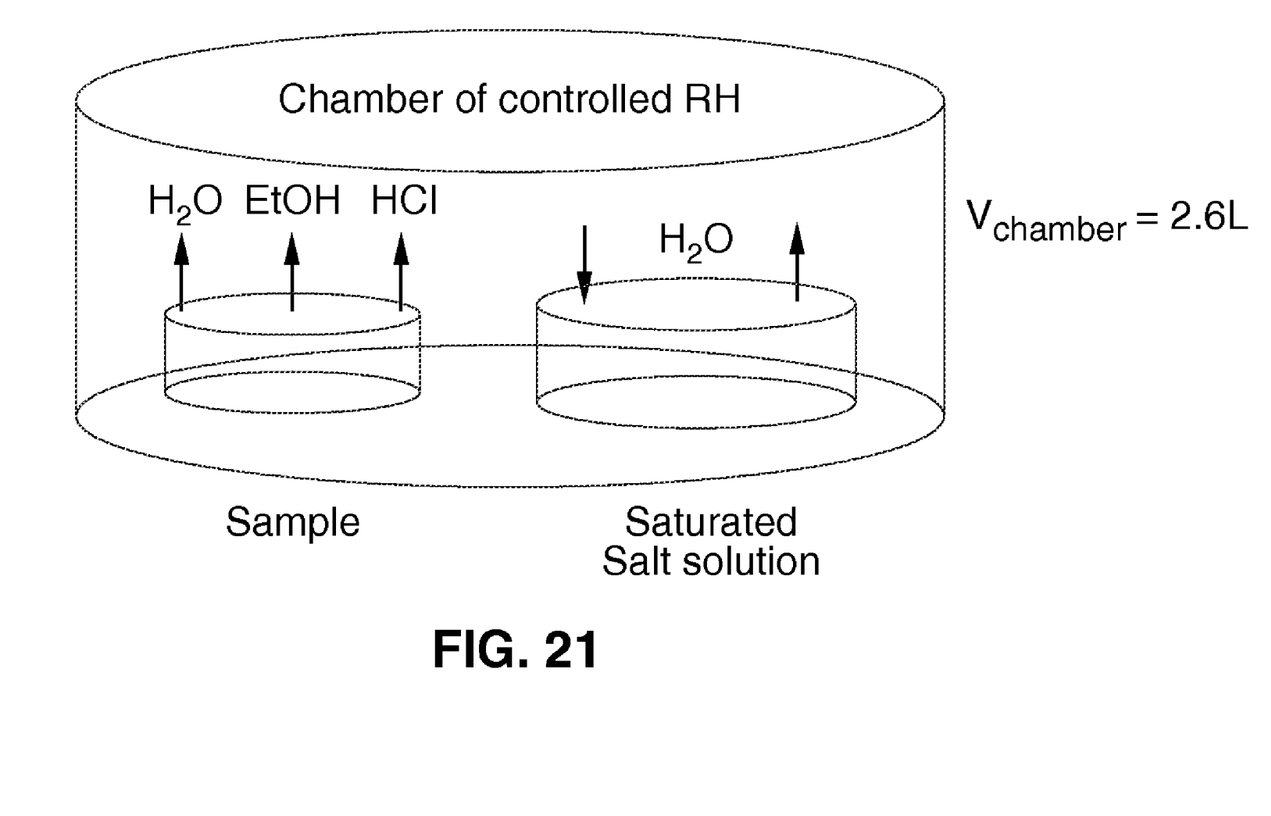
FIG. 21 is a schematic representation of the chamber shown in FIG. 20.

Stamping/micromolding is used to form patterned mesostructured silica-$EO_{20}PO_{70}EO_{20}$ thin films. In the micromolding technique, the self-assembling sol-gel precursor solution undergoes gelation in the microchannels formed by placing a patterned poly(dimethylsiloxane) (PDMS) stamp on a substrate. Approximately 10 μL of the sol-gel precursor solution is placed in drop-form on a Kapton® (polyimide) substrate containing a thin metal or oxide layer on the top surface of the substrate, and a patterned PDMS stamp of ~1-5 $cm^2$ area is placed over the sol-gel precursor solution drop, as shown in FIGS. 20-21. The entire PDMS mold/precursor solution/substrate assembly is placed in a chamber in which the relative humidity or other solvent/cosolvent vapor pressure is held constant (or otherwise controlled), for example, through the use of a saturated salt solution within the chamber. As the solvent (e.g., ethanol or water) is removed over the course of ~3-7 days from the sol-gel precursor solution within the microchannels of the PDMS mold, the self-assembling triblock copolymer organizes into hexagonally-packed cylinders and the silica precursor polymerizes. For the combination of conditions used, in this case a high relative humidity in the sample chamber, the hexagonally-packed cylinders become orientationally ordered perpendicular to the Kapton® substrate. At lower relative humidities in the chamber, the hexagonally-packed cylinders become orientationally ordered parallel to the substrate. Furthermore, optically-responsive species can be dissolved into the sol-gel precursor solution and segregate preferentially into the most compatible regions of the triblock copolymer structure-directing agents associated with the mesostructured composite. Moreover, depending on the dimensions (e.g., length, width, aspect ratio) of the guest species and their interactions with different material components, such guest species can align in preferred directions within the mesostructured product. For example, long organic molecules or nanoparticles can be incorporated and align in the hexagonally-packed cylinders of a hexagonal mesostructured material, including inorganic-organic composites or porous solids. After sufficient time to allow solvent loss, surfactant self-assembly and inorganic cross-linking, the PDMS stamp is removed, leaving behind a patterned mesostructured orientationally ordered inorganic-SDA film, for example, a silica-$EO_{20}PO_{70}EO_{20}$ thin film on a titanium-Kapton® substrate.

Note that extensive flexibility exists with respect to the compositions, periodic structures, and dimensions of the materials described here. A wide range of inorganics can be used in the mesostructured materials, including but not limited to inorganic oxides, metals, semiconducting solids, with disordered, nanocrystalline, partially crystalline, or crystalline frameworks (e.g., titania, aluminosilicates, silicates, or zeolites). The use of an electrically-conductive inorganic framework in the thin film further opens the range of applications for these materials to photovoltaics, sensors, and catalysts. Furthermore, in addition to block copolymers, a variety of structure-directing agents such as other nonionic, cationic and anionic surfactants, microemulsions, or colloids can be used to form the periodic structure or structures. Finally, a diverse list of guest species can be incorporated into the aligned periodic structures of the material, yielding desirable properties. The list of potential guest species includes, but is not limited to, small molecule chromophores, conjugated polymers, nanoparticles, metal clusters, ions, oxide guests, carbon nanotubes, organic molecules, inorganic molecules, organometallic molecules, fullerenes and their derivatives, enzymes, biomolecules, cells, and viruses. Such guest species may interact covalently, ionically, or by other physicochemical interactions within the periodic structured (e.g., mesostructured) materials. Furthermore, carbon precursors including, but not limited to, furfuryl alcohol or resorcinol may be filled into the aligned pore network and subsequently treated to yield a conductive, graphitic replica of the aligned mesoporous material. The exact composition of the mesostructured material will depend on the particular application being pursued.

In addition to the composition of these materials, the processing method can also be modified. While PDMS stamps/molds are inexpensive and adaptable to a wide range of patterns, obtaining sub-100 nm or >1 µm size features or patterns with high aspect ratios often requires the use of stamp/mold materials with higher compression moduli, such as stiffer polymers, photoresist, silicon, sol-gel-derived oxides, or other organic or inorganic compositions. Controlling the solvent concentration of substances in the stamp/mold and/or sample chamber other than water, such as ethanol or other volatile solvents, can further assist in the development and control of structural alignment. In addition, materials other than PDMS can be used as a pattern-directing stamp/mold in order to change the interface and thus nucleation and growth dynamics and direction. Finally, the method of guest species incorporation may be altered. Instead of dissolving the guest species into sol-gel precursor solution, the organic phase of the orientationally ordered, periodic mesostructured materials can be removed through oxidation (e.g., calcination or reaction with ozone) or solvent extraction leaving behind a porous inorganic material. The aligned porous structure of these materials can then be back-filled or functionalized with guest species or objects, such as nanoparticles, conjugated polymers, reactive molecules, or others among those listed the previous paragraph above. This back-filling method could potentially provide higher guest species concentrations in the materials, particularly in patterned thin films.

It will be appreciated that mesostructured inorganic-organic hybrid materials offer novel opportunities for combining the properties of dissimilar organic and inorganic media. The mesostructures formed by self-assembling organic components (e.g., surfactants (including block copolymers), emulsions, colloidal particles) in the inorganic-organic material can be aligned over macroscopic length scales, have tunable chemical properties and pore dimensions, and can be functionalized to allow for the inclusion of a wide range of guest species with high degrees of alignment and dispersion. Furthermore, mesostructured inorganic-organic materials are easily processed into a variety of useful structures, including thin films, fibers, monoliths, and micropatterns made by soft lithography. Paramount among these properties is the ability to control the orientational ordering of the mesostructure and guest species confined within the mesostructure over macroscopic length scales. Controlling the processing conditions of the material through the low-cost patterning approach of micromolding allows one to produce mesostructured organic-inorganic patterned films where the mesostructure features are aligned parallel or perpendicular to the substrate. Without the incorporation of optically-responsive species, these patterned thin films find diverse applications including, but not limited to, photolithography masks with sub-100 nm features, separations membranes, and in microelectromechanical systems (MEMS). If optically-responsive species are incorporated within the mesostructure, these patterned thin films possess anisotropic optical or opto-electronic properties including, but not limited to, non-linearity and polarized absorption or emission, due to the orientationally ordered transition moments of the guest species.

Aligned and patterned inorganic-organic mesostructured materials possessing anisotropic optical properties have potential application in a wide range of optical devices including, but not limited to, electro-optic modulators and switches, optical data storage, optical limiting devices, optical sensors, displays, and lasing materials. Candidate materials for displacing inorganic crystals (e.g., $LiNbO_3$) that are currently in use for non-linear applications must possess high performance, processability, and low cost. Poled-polymer systems in which optically-responsive species are orientationally ordered offer the possibility for high performance, low cost devices. However, until now wholly organic or inorganic materials do not possess all of these necessary properties. Polymer systems have poor thermal stability, a key property for processing and operation of the material in a device. In contrast, sol-gel-derived inorganic oxides containing aligned, optically-responsive species have excellent mechanical and thermal stability. Furthermore, these glasses are inexpensive and easily processed for devices using soft lithography. Unfortunately, the optically-responsive guest species have poor solubility in the inorganic host material, and this low solubility has a detrimental effect on device performance. As a result, neither organic polymers nor inorganic oxides containing guest species alone have widely displaced inorganic crystals in optical devices.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A method of forming an orientationally ordered mesostructured inorganic-organic material produced by molding self-assembling organic agents and network-forming inorganic species in a controlled environment, comprising:
    controlling mesostructural alignment over a range of angles, from parallel to perpendicular to a substrate, by adjusting concentration, concentration gradient or rate of solvent removal at an interface between a sol-gel/structure-directing-agent (SDA) solution and mold wall, external vapor environment or other boundary, and
    by adjusting relative compatibility of different SDA, sol-gel, mold or other boundary components, which establish surface compatibilities of the self-assembling components at a nucleation site/interface.

2. A method as recited in claim 1, further comprising:
    using said molding to achieve thin film patterning and mesostructural orientational ordering on the length scale of said patterning.

3. A method as recited in claim 2, wherein said patterning is on a length scale greater than 50 nm.

4. A method as recited in claim 1, further comprising:
    using said molding to produce a monolith having approximately uniform mesostructural orientational ordering on the length scale of said monolith.

5. A method as recited in claim 1, further comprising:
using said molding to produce a fiber having approximately uniform mesostructural orientational ordering on the length scale of said fiber.

6. A method as recited in claim 1, further comprising:
dispersing orientationally ordered guest species in said mesostructured inorganic-organic material by dispersing the guest species in a self-assembling solution of inorganic precursors, structure-directing agents, and one or more volatile solvents.

7. A method as recited in claim 6, wherein said orientationally ordered guest species comprise small molecule chromophores, conjugated polymers, metal clusters, ions, oxide guests, nanoparticles, nanowires, nanocrystals, carbon nanotubes, fullerenes, semiconducting polymers, organic molecules, inorganic molecules, organometallic molecules, molecules with sensing, catalytic, or other reaction functionalities, enzymes, or other biomolecules, cells, or viruses with biological functionalities, including mixtures thereof.

8. A method as recited in claim 6, wherein said orientationally ordered guest species are optically-responsive.

9. A method as recited in claim 8, wherein said optically-responsive species include, but are not limited to, small molecule chromophores, conjugated polymers, nanoparticles, nanowires, nanocrystals, carbon nanotubes, fullerenes and its derivatives.

10. A method as recited in claim 8, wherein said optically-responsive guest species are associated with the organic regions of said mesostructured inorganic-organic material.

11. A method as recited in claim 8, wherein said optically-responsive guest species are associated with the inorganic regions of said mesostructured inorganic-organic material.

12. A method as recited in claim 6, wherein said orientationally ordered guest species are electronically-responsive.

13. A method as recited in claim 6, wherein said orientationally ordered guest species are electrically-responsive.

14. A method as recited in claim 1, further comprising:
controlling orientational order of said mesostructured material by controlled removal of one or more volatile solvents.

15. A method as recited in claim 14, wherein said orientational order has the form of a hexagonal mesostructure with cylinder-like features oriented parallel to the substrate surface.

16. A method as recited in claim 14 wherein said orientational order has the form of a lamellar mesostructure with layered-like features oriented parallel to the substrate surface.

17. A method as recited in claim 14, wherein said orientational order has the form of a cubic mesostructure with channels oriented with respect to the substrate surface.

18. A method as recited in claim 14, wherein said orientational order has the form of a hexagonal mesostructure with cylinder-like features oriented perpendicular to the substrate surface.

19. A method as recited in claim 14, wherein said orientational order has the form of a lamellar mesostructure with layered-like features oriented perpendicular to the substrate surface.

20. A method as recited in claim 1, further comprising:
controlling orientational order of said mesostructured material by controlled removal of one or more volatile solvents via gradients within a mold device.

21. A method as recited in claim 1, further comprising:
controlling orientational order of said mesostructured material by controlled removal of one or more volatile solvents on a substrate with aligned features.

22. A method as recited in claim 1, wherein said molding comprises:
using a patterned stamp/mold composed of a low compression modulus material, such as poly(dimethylsiloxane) (PDMS), and/or a high compression modulus material such as a cross-linked or glassy polymer, photoresist, silicon, or sol-gel derived oxides.

23. A method as recited in claim 1, wherein said mesostructured inorganic-organic material is formed using a low compression modulus material to direct the dynamics of solvent removal on a patterned surface.

24. A method as recited in claim 1, wherein said network-forming inorganic species form a disordered, partially crystalline, nanocrystalline, or crystalline network.

25. A method as recited in claim 1, wherein one or more of said network-forming inorganic species also contains an organic moiety.

26. A method as recited in claim 1, wherein said network-forming inorganic species include, but are not limited to, a metal oxide, silica, alumina, titania, semiconducting solids, metals, including mixtures thereof.

27. A method as recited in claim 1, further comprising:
removing organic structure-directing species by oxidation or solvent extraction treatments, yielding a mesoporous inorganic material.

28. A method as recited in claim 27, further comprising:
performing surface modification of said mesoporous inorganic material.

29. A method as recited in claim 27, further comprising:
incorporating one or more optically-responsive guest species into said mesoporous inorganic material.

30. A method as recited in claim 29, further comprising:
bonding said optically-responsive guest species to the inorganic framework of the mesoporous film.

31. A method as recited in claim 27, further comprising:
incorporating one or more organic species into said mesoporous inorganic material.

32. A method as recited in claim 31, wherein said organic species incorporated into said mesoporous inorganic material are treated to yield an orientationally ordered mesostructured carbon material.

33. A method as recited in claim 32, wherein said orientationally ordered mesostructured carbon material is a mesoporous carbon material.

34. A method as recited in claim 33, wherein said orientationally ordered mesoporous carbon material is a film.

35. A method as recited in claim 34, wherein said orientationally ordered mesoporous carbon material has a cubic mesostructure.

* * * * *